Jan. 16, 1968  R. E. HARRINGTON ET AL  3,363,587
HAY WAFERING MACHINE
Filed June 10, 1963  3 Sheets-Sheet 2
FIG. 3
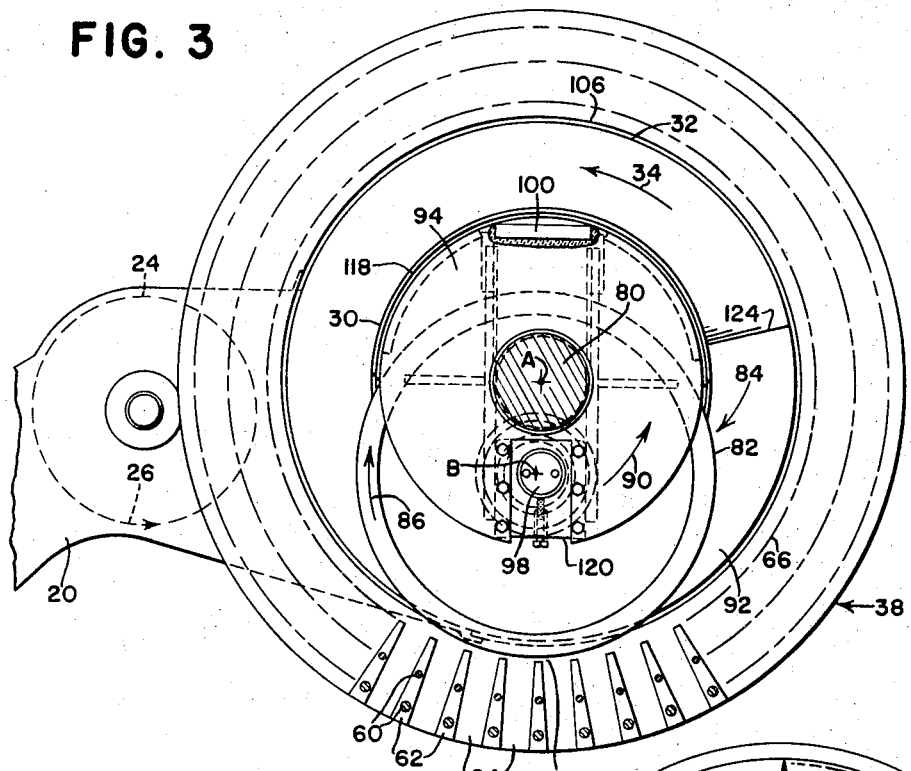
FIG. 4
FIG. 5
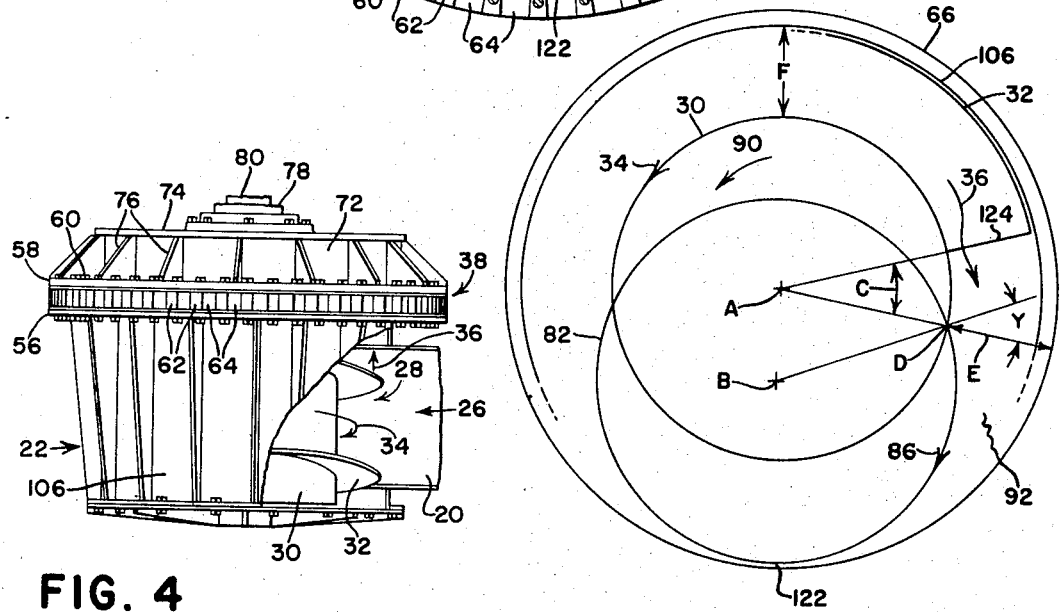
INVENTORS
R. E. HARRINGTON
W. M. ROLL
M. W. FORTH

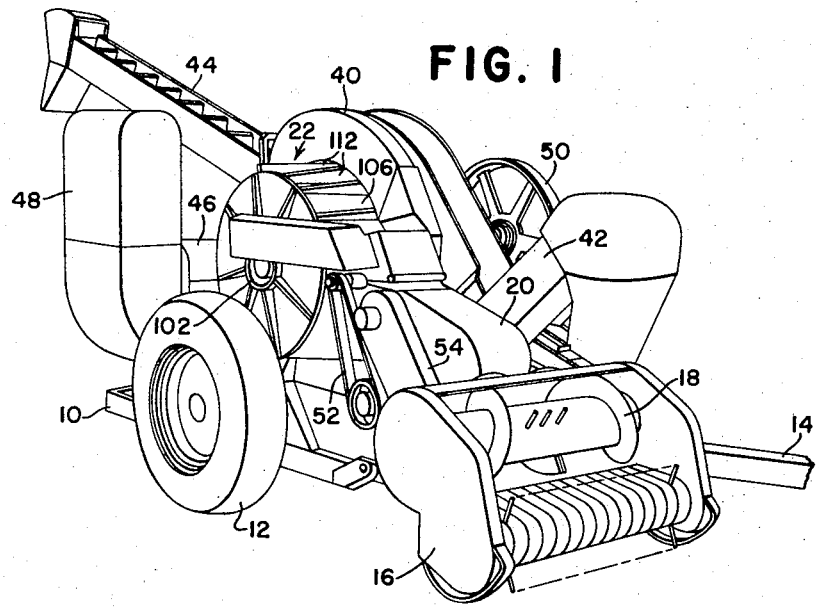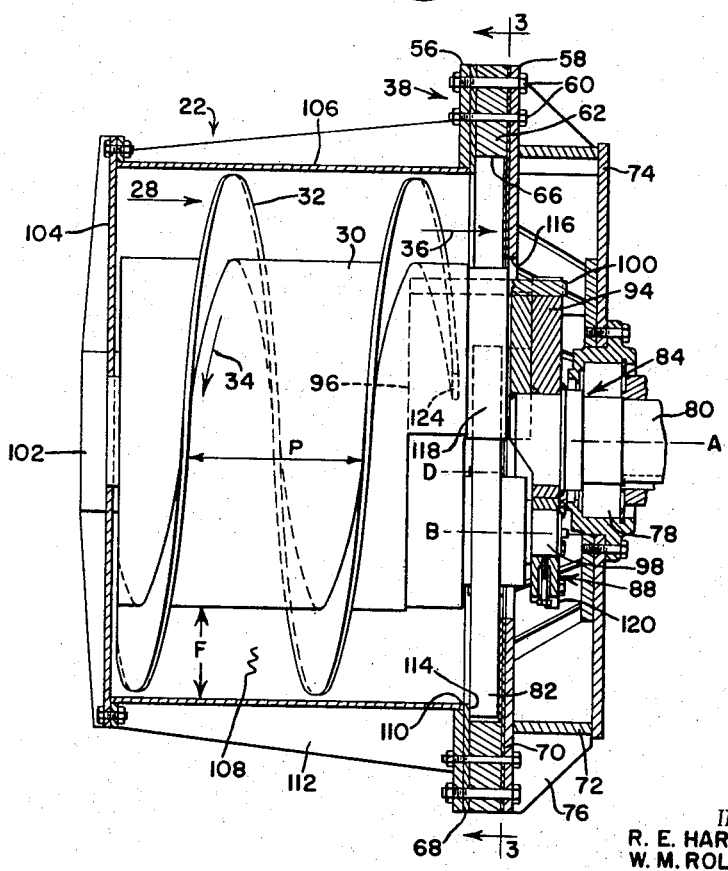

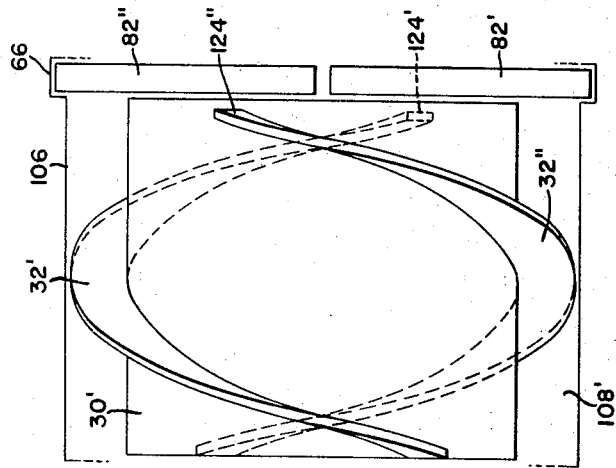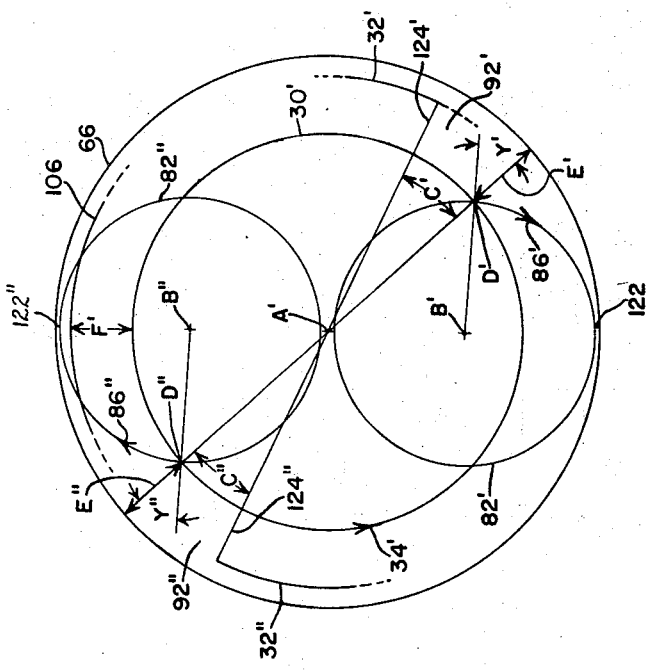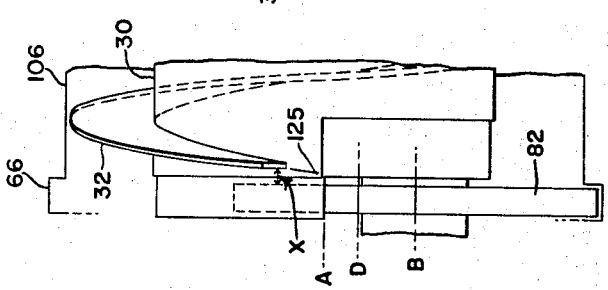

United States Patent Office 3,363,587
Patented Jan. 16, 1968

3,363,587
HAY WAFERING MACHINE
Roy E. Harrington, Walter M. Roll, and Murray W. Forth, Moline, Ill., assignors to Deere & Company, Moline, Ill., a corporation of Delaware
Filed June 10, 1963, Ser. No. 286,645
6 Claims. (Cl. 107—14)

This invention relates to a machine for wafering hay and like forage crops and more particularly to improvements in means for increasing the effectiveness, capacity and efficiency of such machine.

A hay wafering machine, as it has become known in the art, is intended in some areas to replace the conventional automatic baler, from which it distinguishes in many respects; although, it operates on substantially the same type of crops. For example, whereas a baler will pick up hay and the like from previously farmed windrows and form same into individual bales of a size in the range of 14″ x 18″ x 32″ and a density in the range of eight to ten pounds per cubic foot, a wafering machine, operating on similar windrows, is designed to produce wafers typically in the size range of 2″ x 2″ x random lengths (from ¾″ to 2″) and having a bulk density in the order of twenty-five pounds per cubic foot and a unit density of around forty pounds per cubic foot. Intermediate these two is the so-called high-density baler, producing bales in the size range of 12″ x 14″ x 32″ and having a density of approximately sixteen pounds per cubic foot. The typical standard baler and the high-density baler are very much alike in that the compacting pressures are derived from plungers and some form of tying medium, normally twine or wire, is used. In the case of a wafering machine, compaction is accomplished by other methods, principally rotary, although some reciprocating types are known, but these have in common the dependence on the wafer itself to retain its own formation; that is to say, no tying medium is used. On the other hand, in some cases some form of binder may be introduced to the crop while it is being wafered. The principal advantage of a wafering machine over a baler lies in the nature of the product, which is more easily handled, stored, fed, ground etc.

This is not to say, however, that the wafering machine is not without its problems. For example, in the present state of the art, such machines are limited mainly to the wafering of alfalfa and similar legumes and encounter some difficulty in handling grasses or mixtures of grasses and legumes. The ability of a wafering machine to perform efficiently is also affected by such factors as crop moisture, windrow size and density, length of cut etc. For example, the crop should be field-cured to a moisture content of 15% or less, with the moisture evenly distributed in the stems and leaves. Rewetting upon feeding to the machine (a conventional practice) to 20–22% may be required for wafering. A baler can bale hay from as dry as 8% to as wet as 40–45% moisture content. However leaf loss is severe below 12% moisture content, and dense bales that must be dried to prevent spoilage will be made above 25% moisture content.

According to the present invention, and having these factors and limitations in mind, it is a principal object to provide an improved machine capable of producing wafers at a commercially acceptable rate while performing efficiently without serious breakdown, plugging and requirements for adjustment. The invention is devoted primarily to improvements in that type of wafering machine utilizing an annular die provided with a plurality of uniformly circumferentially spaced radial die cells having their inlet ends opening in common at what may be regarded as a circular track about which a rolling press wheel or wheels orbit in planetary fashion to force the hay or like crops successively into the die cells, ultimately compacting same and forming what may be considered an extrusion product. In machines involving a reversal of parts, the die ring is rotated and the press wheel carrier is fixed, the press wheel of course being free to rotate but about a fixed axis. Since the fixed-die, rotating-press-wheel-type is the more common machine, the present disclosure will proceed on that basis, recognizing of course that the principles involved are equally applicable to the other type.

In any event, the cross-sectional size of the die cells determines the cross section, of course, of the wafer. Although die cells may range in length from 6″ to 12″, the length of the wafer depends upon the extent to which the material is extruded from the respective cells before breaking off. In some cases, breaker means are provided to break the wafers off after they have attained a predetermined length, say, two inches or so. In some cases, the wafers break off because of their own weight. In this respect, it will be clear that the material compacted into the die cells will be in the form of successive charges; that is, it is unlikely that a die cell will be completely filled from one end to the other during one pass of the press wheel. Consequently, each die cell will be filled with successive charges, and in those cases in which the charges do not adhere together, the wafers are apt to break apart at the junctions between charges. Therefore, it is desirable that each charge be of an optimum length and density because thin, small, low-density charges are apt to crumble and thus contribute to the accumulation of "fines" in the bulk load of wafers. This constitutes not only a waste of material but also produces dust, chaff, etc., which is undesirable from the standpoint of handling and feeding. Therefore, it is another principal object of the invention to provide a feeding system in which charges of substantial size and density can be accumulated in the die cells.

As a corollary to the above, it is recognized that material fed to the die means or compression area at rates and in amounts that are excessive in the circumstances create various problems. For example, feeding at rates beyond the capacity of the engine or equivalent power source will only stall the engine or subject the drive train to undue high forces, resulting in stoppages for clean-out, repair or adjustment; or, if the layer, charge or mat of hay placed in front of the press roll is too thick in proportion to the diameter of the press roll the hay will skid circumferentially in front of the orbiting roll rather than being forced radially outwardly. It has been found now that the ratio of the mat thickness to roll diameter is dependent upon the coefficient of friction of the material in contact with the die track. (Wetter hay has a lower coefficient of friction and will slide circumferentially more easily than optimum-moisture-content hay, and thus should be fed in a thinner layer.) Therefore, it is desirable to provide some form of means for limiting the rate and size of the mat of material fed to the die means on the basis of a ratio to the diameter of the press roll or rolls and the circumference of the die track.

It is known to feed the die means by coaxial feed means such as an auger or its equivalent which receives the hay or like crop from a suitable feeder and which moves such crop axially and circumferentially to the circular track of the die means, where it is rolled over by the orbiting press wheel or wheels, which compacts this material into successive die openings. Theoretically, the mat is fed continuously and the orbiting press wheel continuously feeds this mat into successive die cells to form successive charges ultimately into acceptable wafers. In this respect, it is a further object of the invention to provide a system whereby the feed means is coordinated with not only the delivery of material to the die means but with the acceptance of material from the feed means.

In a wafering die of the type under discussion, the circular press wheel, rolling about the interior track of the annular die means may be regarded, in a stationary position, as a circle tangent to the circle of the track, and the area circumferentially ahead of the press wheel, as respects the direction of rotation of the press wheel carrier, may be regarded as a crescent-shaped bight. It is found that the delivery of the material from the circumferentially and axially feeding means (e.g., auger) should be timed with the moving press wheel so that material is delivered to the bight somewhat circumferentially ahead of the "point of tangency." The provision of an optimum discharge point is another object of the invention. It is an allied object of the invention in this respect to provide a ratio between the diameters of the track and press wheel such that the bight is so proportioned as to be capable of handling a mat of such thickness and density as to produce desirable wafers. This in turn is related to the diameter of the core of the rotary means which feeds the mat to the crescent or bight. On the basis of the acceptance of certain travel speeds, windrow widths, speeds of rotation etc., and bearing in mind that an industry-accepted figure for capacity is the production of ten tons of wafers per hour (based on accepted capacities of presently used balers), the invention seeks to provide, within limits, an optimum conveying capacity of the auger that discharges the hay in front of the orbiting press roll or rolls, and an optimum ratio among the diameters of the feed means housing and core, the press wheel or wheels and the track.

There are other machines operating on the roller-die-extrusion principle; viz, the so-called pellet mills used to pellet feed for livestock, poultry, cats, dogs, etc., but attempts of designers, in the field of wafering hay and like crops, to draw on pelleting principles have so far proven futile because of the vast differences in environmental characteristics; e.g., pelleted material is initially relatively dry, finely ground, of uniform moisture, fed into the pelleting machine at a carefully controlled, uniform rate, is pre-treated before pelleting, pelleting pressures are extremely high (8,000–10,000 p.s.i.), the end product is small (1/8" to 3/8" diameters and random lengths of 1/4" to 1 1/2"), hard and of uniform appearance. Hence, the art of hay wafering, presenting new problems, has developed along lines different from those of balers and pellet mills.

The foregoing and other important objects and desirable features inherent in and encompassed by the invention will become apparent as preferred embodiments thereof are disclosed in detail, by way of example, in the ensuing description and accompanying sheets of drawings, the figures of which are described below.

FIG. 1 is a perspective of a representative type of hay wafering machine.

FIG. 2 is an enlarged sectional view through the feed and die means.

FIG. 3 is a section taken substantially on the line 3—3 of FIG. 2.

FIG. 4 is a top view, on a reduced scale and with portions broken away, illustrating the relationship of the feed means to the die means.

FIG. 5 is a schematic view illustrating the ratios and proportions involved.

FIG. 6 is a fragmentary view of a portion of the auger and press roll as seen from the side diametrically opposite to FIG. 2.

FIG. 7 is a schematic view on the order of FIG. 5 but showing a double press roll and double auger flight arrangement.

FIG. 8 is a fragmentary schematic elevation similar to FIG. 2 but illustrating the arrangement of FIG. 7.

The wafering machine chosen for purposes of illustration is of the type adapted to be drawn by an agricultural tractor (not shown) or its equivalent and comprises a mobile frame 10 carried on ground wheels 12 (only one of which appears in the drawing) and provided with a forwardly extending tongue 14 which may be hitched to the draft vehicle. Now, regarding the machine as seen from the rear by a person standing behind the machine and facing forwardly, it will be seen that the forward right-hand portion of the machine includes a conventional pickup 16 of the type used on balers and like forage gathering machines. This pickup includes a laterally compressing auger means 18 which narrows the pick-up to an acceptable size for introduction to an initial feeder 20, here comprising a housing within which any form of rotary device may be carried to facilitate the transfer of crops from the housing to a main feed or auger housing 22. A typical rotary device is shown in dotted lines at 24 in FIG. 3, its direction of rotation being designated by the arrow 26. This arrow is also used in FIG. 4 to designate the introduction of material to the auger housing 22.

Coaxially journaled within the auger housing 22 is a rotary feed means 28, here comprising an auger core or tube 30 and its helical flight 32, for moving material circumferentially of the housing (arrow 34) as well as axially of the housing (arrow 36) for delivery of the material to the die means, denoted in its entirety by the numeral 38. The die means is enclosed at 40 in FIG. 1, but its structure is clearly shown in FIGS. 2 and 3. These details will be described later. For the present, suffice it to note that the material is ultimately formed by the die means into wafers which are extruded radially from the die means and collected by suitable conveying means 42 which delivers the wafers upwardly and forwardly for transfer to an elevator 44 for discharge rearwardly into any suitable form of towed vehicle (not shown). As is typical in machines of this character, power is supplied by any suitable internal combustion engine, the presence of which is indicated here by the numeral 46. The engine in this case is equipped with a shrouded air intake 48. These details are not important but are referred to herein for background purposes only. The transmission of power to the moving parts of the machine is accomplished in any suitable manner, there being visible in the drawing a belt-driven sheave 50 for the feed means 28, a belt 52 for driving the rotary device 24 and a shield 54 covering the drive for the pickup 16 and initial auger compressor 18. Here again, these details may be varied within rather wide limits.

As is the case in the operation of a typical baler, the field of hay or like crops has been previously cut and formed into windrows. These are picked up by the pickup means 16, laterally compressed by the double-reverse auger 18 and conveyed to the feeder housing 20 and thence into the auger housing 22. Depending upon the growth of hay, the width of a typical windrow is on the order of between eighteen and twenty-four inches. In some cases, the stand of hay is so light as to require that two windrows be formed into one. The width of the stream of crop is narrowed to approximately fourteen inches in the housing 20, and this stream has a density substantially the same as or less than the crop in the windrow, which ranges in the order of one to two pounds per cubic foot. Normally, the speed of the device 24 will be substantially higher than that of the pickup and consequently the density will be decreased. If the windrows are relatively light, the machine may have a travel speed in the order of four to five m.p.h. This may require a decrease to two to three m.p.h. in the case of heavier windrows. A short period of experience with the machine will enable the operator to determine his optimum travel speed.

The die means 38 is primarily in the form of an annulus, here made up of a plurality of parts. Among these parts are a pair of parallel rings or side plates 56 and 58, both in this case being circular at their inside and outside peripheries. The inside diameter of the plate 58 is considerably smaller than that of the plate 56, for reasons that will be presently explained. Rigidly secured between the two plates, as by a plurality of circles of bolts 60, are uniformly circumferentially spaced radial die blocks 62 providing a like plurality of uniformly circumferentially spaced radial die cells 64 (FIG. 3). The inner ends of the die blocks 62 lie on what may be regarded as a circular track 66. It will be recognized, of course, that if the inner end of each die block is squared off, the track 66 will not be perfectly circular. However, the track may be so regarded, with this in mind. Suitable additional rings or plates may be interposed between the plates 56 and 58 and the die blocks 62, but for present purposes these may be disregarded except to note their presence at 68 and 70.

Rigidly secured to the left-hand plate 58 (right-hand in FIG. 2) is a steel band 72 which serves as a spacer between the plate 58 and an outer or right-hand steel disk 74. The plate 58, band 72 and disk 74 may be rigidly secured by welding and may further be reinforced by webs 76. This portion of the structure is covered by a shield in FIG. 1 but is clearly visible in FIGS. 2 and 4. The disk 74 carries coaxially therein (which is also the axis of the annular die means 38) any suitable bearing 78 for journaling an input shaft 80. The previously referred to sheave 50 is keyed to the shaft 80 and is belt-driven from the engine 46. The direction of rotation of the shaft 80 is that indicated by the arrow 34, previously referred to.

The shaft 80 is part of rotatable carrier means 84 coaxial with and connected to the auger means 28 for rotating the auger means as well as for carrying a circular press wheel 82. The axis of the die means 38, which is also the axis of the rotatable feed means 28, is designated in the drawings by the letter A. The axis of the press wheel 82 is designated by the letter B and is eccentric to the axis A so that the press wheel 82 orbits about the axis A while it rolls about its axis B in the direction of the arrow 86 (FIGS. 3 and 5). The press wheel is journaled on crankshaft means 88, forming part of the rotatable means 84, and its orbital direction is indicated by the arrow 90, which is of course in the same direction as that of the auger 28 (arrow 34) and shaft 80.

The axial disposition of the press wheel 82, as respects the annulus 38, is such that the press wheel is in radial register with the track 66 and rolls about this track as it orbits. As will be clear in the drawings, a slight clearance is provided but for purposes of exposition the circle of the press wheel 82 may be regarded as tangent to the circle of the track 66. Looking now at FIGS. 3 and 5, and having regard to the directions of rotation 34 and 90, it will be seen that the area circumferentially of the "point" of tangency between the circles 82 and 66 is in the form of a crescent-shaped bight 92. It will further be evident that if material is fed into this bight, it will be rolled over by the press wheel 82 as the press wheel orbits in the direction of the arrow 90. Since the relative positions of the track 66 and axis A and the distance between axes A and B are fixed, it follows that this material must either be extruded into the die cells 64 or pushed ahead of the press wheel. From this, it follows that the smaller the amount of material introduced to the bight 92, the easier it will be for the press wheel to roll over it and to push it into the die cells. Conversely, the larger the amount of material introduced to the bight 92, the more difficult it will be to force it into the die cells. Consequently, it will be seen that the proportions and ratios in this area become significant. These will be detailed subsequently.

The crankshaft means 88 establishes a connection between the input shaft 80 and the auger core 30, as well as journaling the press wheel 82 on the axis B, and further includes inner and outer cheeks 94 and 96, one of which is coaxially secured, as by welding, to the shaft 80, and the other of which is coaxially secured within the track-proximate end of the hollow auger core 30 so that the two cheeks rotate in unison, being joined by a press wheel shaft 98 on the axis B and further cross connected by a rigid member 100 diametrically opposite the press wheel shaft 98. The opposite end of the auger core 30 is mounted on any suitable shaft coaxial with the shaft 80 on the axis A and journaled in an appropriate bearing, the nature and significance of which are generally indicated by the numeral 102 in FIG. 1.

In the area just referred to, the auger housing 22 is closed by a right-hand circular end wall 104 which carries the journal and support 102, and this wall (FIG. 2) is axially spaced from the die means 38. The die means and wall 104 are interconnected by an annular wall 106, here cylindrical, which is in surrounding relationship to the auger core 30 so as to establish an interior annular feed-receiving space 108. The delivery end of the annular wall 106 occurs at 110, which is in axial register with the die track 66, the inside diameter of the wall 106 being generally equal to the circle of the track 66. This end of the wall 106 may be rigidly secured as by welding or otherwise to the plate 68, and the entire structure is externally reinforced by a plurality of ribs 112. The difference in inside diameters between the track 66 and the wall 106 occurs because of the desirability of providing a peripheral shoulder or annular offset at 114 in which the diameter of the track 66 exceeds that of the wall 106 by an amount sufficient to prevent material from moving axially out of the bight area and back into the auger housing as the press wheel passes over it. In this regard, it should be noted that there will be a certain amount of resilience in the hay as it is forced into the die cells and, after the press wheel passes over a particular die cell, the material therein will spring back to a certain extent. The annular shoulder 114 reduces the amount of springback and prevents it from falling out of the die track. However, this should not be read as limiting the invention. At this point, it is well to note the reason for the smaller inside diameter of the ring 58 as providing means whereby the material fed by the auger cannot be forced axially beyond the track but is confined to the track so as to be operated on by the press wheel. The opening in the ring 58, as at 116, is substantially closed by the press wheel itself in association with an axial, substantially semicircular extension 118 of the auger tube which assures that the efficiency of the machine is not lowered by loss of material in undesirable areas.

By way of explaining what appears to be an eccentricity of the press wheel 82 to the axis B in FIG. 3, attention is directed to the provision at 120 for adjustment of the axis B for establishing the necessary clearance between the periphery of the press wheel 82 and the track 66, which clearance was previously referred to and which is identified here as being in the area of the lead line from the numeral 122. For purposes of exposition, the area 122 may be also referred to as a "point of tangency" between the press wheel and the track. The details of the adjustment at 120, as well as those involving the construction of the crankshaft means 88, form the subject matter of assignee's copending application Ser. No. 162,670, filed Dec. 28, 1961, now abandoned and refiled as Ser. No. 363,045 on Apr. 16, 1964, also abandoned and refiled as Ser. No. 453,306 on May 5, 1965.

The necessity for a relatively heavy and sturdy construction of the crankshaft meas 88 will be clear when one considers the nature of the loading involved (e.g., bearing loads in the order of 80,000 to 100,000 pounds). For that reason, a simple crankshaft, such as one absent the tie member 10, will not suffice. Where two press wheels are used instead of one, their shafts will be diametrically opposite and each shaft will serve as a tie member (FIGS. 7 and 8). It follows therefore that the presence of the tie member 100 or its equivalent establishes a practical upper limit on the diameter of the single press wheel, since it is obvious that the tie member must lie outside the diameter of the press wheel. This, taken in conjunction with the optimum outside diameter of the auger core 30, dictates a theoretical maximum diameter of the press wheel 82 equal to the diametrical distance between the point of tangency 122 (for example) and the point of tangency between such theoretical press wheel and the opposite portion of the auger core 30. Stated otherwise, the larger the diameter of the press wheel becomes, the more closely the points A and B approach coincidence. As a corollary to this proposition, it follows that the crescent or bight decreases and ultimately disappears as the points A and B become coincident. In other words, the smaller the crescent the smaller the amount of material that will be accepted between the press wheel and the die track 66.

As the press wheel becomes larger, so must the auger core, in situations in which the type of crankshaft means shown here is a practical necessity, because, fundamentally, axis B should be within the circumference of the core, as should the tie member 100. When two or more press wheels are used, the press wheel shaft axes (B', B", FIG. 7) should be within the core circumference. As the auger core 30 becomes larger, the material-receiving annular space 108 becomes smaller, unless the inside diameter of the annular wall 106 of the auger housing 22 is increased, but this requires an increase in the diameter of the track 66. Therefore, it is seen that certain limitations are imposed. Conversely, it follows that the auger core 30 may be made smaller but only at the expense of reducing the diameter of the press wheel 82, accompanied by an increase in the "radial dimension" of the crescent or bight, until ultimately the amount of material that can be fed into the bight becomes so great and the press wheel becomes so small as to be unable to roll over the material that could be introduced ahead of it. This is particularly true when it is noted that reduction in the size of the auger core 30 increases the size of the feed-receiving space 108, thereby enabling that space to accommodate more material and therefore to force material into the path of the press wheel to the point that the machine becomes inoperative.

Another factor that plays an important part here is the location of the terminal end of the auger flight 32, as at 124, relative to the leading portion of the periphery of the press wheel 82. It will be clear that the terminal end 124 cannot be placed in the area of that portion of the press wheel 82 that exceeds the diameter of the auger 30, for the material then would be forced against the right-hand face of the press wheel and would not enter the track 66. It also follows that the terminal end 124 of the flight cannot be placed too far in advance of the press wheel 82, for it then becomes closer to the trailing portion of the press wheel, and the portion of the flight diametrically opposite the terminal portion 124 becomes axially too close to the press wheel to enable proper feeding of the material. Stated otherwise, the distance between the press wheel and the portion of the flight 32 diametrically opposite the terminal portion 124 should be on the order of one-half the pitch of the flight (see P, FIG. 2).

Looking now at FIG. 5, it will be seen that the circles of the press wheel 82 and auger core 30 intersect at D and that the maximum radial distance (dimension E) between the point of intersection D and the track 66 occurs on a radius extended from A–D. This may be regarded as the "wide" part of the crescent or bight 92, the "point of tangency" 122 being a narrow or infinitesimally small part. The dimension E compares favorably with the radial dimension F (FIGS. 2 and 5) of the annular space 108 between the exterior of the auger core 30 and the interior of the wall 106.

The relationship of the terminal end 124 of the auger flight is best expressed as follows, looking now at FIG. 6. The root of the flight extended, as at 125, is "aimed" at the point D but the flight itself is terminated circumferentially short of point D so as to leave it axially short of the press wheel by a small amount X (FIG. 6). The angle between the line AD and the radius on which the end 124 lies is shown at C in FIG. 5. This could be varied in the order of −5° (clockwise of line AD) to +25° (counterclockwise of line AD). Where two smaller press wheels are used (180° apart), two auger flights are used, one for each press wheel, and each flight will have its terminal end related to its press wheel in the manner aforesaid. See FIGS. 7 and 8 wherein the reference numerals and letters previously used are repeated with primes for the one press wheel 82' of the pair and double primes for the other press wheel 82" of the pair. Auger flights 32' and 32" having terminal ends 124' and 124", respectively, deliver respectively to the wheels 82' and 82". The housing 106 and track 66 remain unchanged. Corresponding other points, parts etc. appear at A', B', B", C', C", D', D", E', E", 86', 86", 92', 92", 108', 122', 122", 124', 124" etc. However, because of the lower speed incident to the use of the doubled arrangement, the lead of the flights 32', 32" is considerably increased over that of the single flight 32. This is explained as follows: With a given engine and a requirement for twice the torque, the speed will be approximately halved where two press wheels and two auger flights are used to convey the same amount of hay.

Since, as previously described, the size of the annular space 108 determines to a large extent the amount of material acceptable by the auger housing 22, it follows that this space multiplied by the lead of the auger flight in turn determines the volume of material that may be conveyed per revolution of the auger flight 32, or per orbit of the press roll or rolls. On the basis of calculating volume and density, an acceptable density of material being conveyed will be in the order of 1.5 pounds per cubic foot, which is acceptable to the crescent 92 because of the favorable comparison between the dimensions E and F, the material leaving the terminal end 124 of the flight generally in the direction of the arrow 36 just in advance of the orbiting and rolling press wheel 82. Another function of the relatively large diameter of the auger core 30 is that the conveyed mat or "ribbon" of material is kept outwardly near the wall 106 and therefore is outwardly near the track 66, where it is more easily "run over" by the press wheel. It can be seen that as the core diameter 30 is decreased the point of contact of hay with the press roll at D is such that the surface of the press roll provides a component of movement circumferentially forward rather than radially. Favorable results have been accomplished by a construction in which the diameters of the parts are as follows: Track 66—thirty-six inches; wall 106—thirty-three to thirty-four inches; auger core 30—twenty to twenty-four inches; and press wheel 82—sixteen to twenty-four inches. The smaller auger core (twenty inches) would be combined with the larger (twenty-four inch) press roll, the larger core (twenty-four inches) with the smaller (sixteen inch) roll or rolls. Since the mat thickness is determined by the dimension F, it will be seen that this is less than the radius of the press wheel 82. Excellent results are attainable where F is approximately one-half the radius of the press wheel. Variations are of course permitted, but where F becomes substantially less than one-third or greater than two-thirds of the press wheel radius, the results are, respectively, that the mat is too thin and too thick. This may be stated otherwise as follows: The ratio of the diameter of the housing 106 minus the diameter of the core 30 divided by the diameter of the wheel 82 should be not substantially greater than about 70%, with an ideal limit in most conditions in the area of about 50%–60%. The above ties in with the circumferential offset of the terminal end 124 of the flight 32 from the intersection D of the circles of the auger core 30 and press wheel 82, measured at the circumference of the auger core (angular dimension C), which, measured linearly rather than in degrees, is less than the radius of the press wheel 82.

Still another way of looking at the relative proportions of the parts is this (FIG. 5 for the single press wheel): It was previously said that the circles of the press wheel and core intersect at D and that a line from the center A of the core and passing through D gives the line ADE. Now, a line extended from B, the center of the press wheel, through D, will intersect line ADE and form angle Y. This angle may be in the range of 20°–54° and preferably should not exceed 45°.

The same thing holds true in the two-press-wheel design (FIG. 7) where lines A'D'E and B'D' form angle Y' and where lines A"D"E' form similar angle Y".

Number of flights, lead and auger speed are all interrelated. Engine H.P. can be selected and matched by proper combination. If all physical factors are held constant, the r.p.m. of the auger should be reduced in a direct ratio to reductions in engine size. The wafering rate will also be reduced in a direct ratio.

In a typical machine, operating at speeds in the nature of those previously referred to and equipped with an internal combustion engine rated at, say, 200 H.P. and with an auger and crankshaft speed in the range of 60 to 90 r.p.m. with two flights and two press rolls or 120 to 150 r.p.m. with one flight and one press roll, the feeding of a mat having a density of 1.5 pounds per cubic foot in the auger housing will give the capacity previously noted; namely, ten tons per hour; or, stated otherwise, twenty H.P. hours per ton. The thickness of the mat (dimension F as fed and E as expanded because of the offset at 114) is such as to be easily accommodated by the press wheel 82, affording charges of adequate size and density without overload. Actually, as a safety factor for overload, the theoretical volumetric conveying capacity of the auger, as determined by the density, flight height, lead, and revolutions, should be not more than twice the processing rate of the die means. The relationship of the shape and size of the crescent 92 to the track 66 and advancing portion of the periphery of the press wheel 82 may be regarded as an "approach angle," which in this case is most favorable to efficient operation at the rates and capacity noted, insuring continuous operation of the machine in all but extremely abnormal conditions. These same factors are considered in the two-wheel arrangement of FIGS. 7 and 8, as discussed above.

It will thus be seen from the foregoing that the overall operation of a hay wafering machine is improved by properly proportioning the components according to the present invention. Features, and advantages other than those enumerated will readily occur to those versed in the art, as will many modifications and alterations in the specific examples given, all without departure from the spirit and scope of the claims.

What is claimed is:

1. In a machine for wafering hay and the like, the combination of:
(I) support means
(II) die means in the form of an annulus carried by the support means and including
 (A) an inner circular track and
 (B) a plurality of radial die cells spaced uniformly circumferentially about the annulus and respectively having inlet ends at said track;
(III) rotatable means coaxial with the track and including
 (A) a press wheel arranged eccentrically within the track for orbital movement about the annulus axis so that the periphery of the wheel substantially rolls on said track;
(IV) a feed housing having
 (A) an annular wall coaxial with the annulus and extending from
  (a) an open delivery end in register with the track to
  (b) a remote end away from the track,
  (c) said wall having a feed opening spaced axially from said track for receiving hay and the like;
(V) means cooperative with the housing for moving hay circumferentially and axially about the interior of said annular wall for discharge through said delivery end to the track in circumferential advance of the press wheel, said means including
 (A) a core coaxial and rotatable with said rotatable means and having a diameter less than that of said annular wall so as to afford
  (a) an annular space, and
 (B) a helical flight affixed to and wound around said core in said annular space to engage hay and the like and having
  (a) a terminal end
   (i) at the track-proximate end of said core and
   (ii) circumferentially offset from the intersection of the circles of the core and press wheel by an angular amount of between 25° in the direction of rotation of the core and 5° in the opposite direction.

2. The invention defined in claim 1, in which:
(VI) the relative diameters of said core, track, annular wall and press wheel are such that the radial dimension of said annular space is less than the radius of the press wheel.

3. The invention defined in claim 1, in which:
(VI) the relative diameters of said core, track, annular wall and press wheel are such that the radial dimension of said annular space is in the order of one-third to two-thirds of the radius of the press wheel.

4. In a machine for wafering hay and the like, the combination of:
(I) support means
(II) die means in the form of an annulus carried by the support means and including
 (A) an inner circular track and
 (B) a plurality of radial die cells spaced uniformly circumferentially about the annulus and respectively having inlet ends at said track;
(III) rotatable means coaxial with the track and including
 (A) a press wheel arranged eccentrically within the track for orbital movement about the annulus axis so that the periphery of the wheel substantially rolls on said track;
(IV) a feed housing having
 (A) an annular wall coaxial with the annulus and extending from
  (a) an open delivery end in register with the track to
  (b) a remote end away from the track,
  (c) said wall having a feed opening spaced axially from said track for receiving hay and the like;
(V) means cooperative with the housing for moving hay circumferentially and axially about the interior of said annular wall for discharge through said delivery end to the track in circumferential advance of the press wheel, said means including
 (A) a core coaxial and rotatable with said rotatable means and having a diameter less than that of said annular wall so as to afford
  (a) an annular space, and
 (B) a helical flight affixed to and wound around said core in said annular space to engage hay and the like and having
  (a) a terminal end
   (i) at the track-proximate end of said core and
   (ii) circumferentially offset from the intersection of the circles of the core and press wheel in the direction of rotation of the core by an amount less than the radius of the press wheel.

5. In a machine for wafering hay and the like, the combination of:
(I) support means
(II) die means in the form of an annulus carried by the support means and including (A) an inner circular track and
(B) a plurality of radial die cells spaced uniformly circumferentially about the annulus and respectively having inlet ends at said track;
(III) rotatable means coaxial with the track and including
(A) a single press wheel arranged eccentrically within the track for orbital movement about the annulus axis so that the periphery of the wheel substantially rolls on said track;
(IV) a feed housing having
(A) an annular wall coaxial with the annulus and extending from
(a) an open delivery end in register with the track to
(b) a remote end away from the track,
(c) said wall having a feed opening spaced axially from said track for receiving hay and the like;
(V) means cooperative with the housing for moving hay circumferentially and axially about the interior of said annular wall for discharge through said delivery end to the track in circumferential advance of the press wheel, said means including
(A) a core coaxial and rotatable with said rotatable means and having a diameter less than that of said annular wall so as to afford
(a) an annular space, and
(B) a feed element secured to said core and extending into said space to engage hay and the like and terminating axially adjacent to said press wheel; and
(VI) the relative diameters of said core, track, annular wall and press wheels are as follows:
(A) core in the order of 50%–80% of that of the track,
(B) track in the order of that of the annular wall,
(C) press wheel in the order of 60%–80% of that of the track.

6. In a machine for wafering hay and the like, the combination of:
(I) support means
(II) die means in the form of an annulus carried by the support means and including
(A) an inner circular track and
(B) a plurality of radial die cells spaced uniformly circumferentially about the annulus and respectively having inlet ends at said track;
(III) rotatable means coaxial with the track and including (A) a single press wheel arranged eccentrically within the track for orbital movement about the annulus axis so that the periphery of the wheel substantially rolls on said track;
(IV) a feed housing having
(A) an annular wall coaxial with the annulus and extending from
(a) an open delivery end in register with the track to
(b) a remote end away from the track,
(c) said wall having a feed opening spaced axially from said track for receiving hay and the like;
(V) means cooperative with the housing for moving hay circumferentially and axially about the interior of said annular wall for discharge through said delivery end to the track in circumferential advance of the press wheel, said means including
(A) a core coaxial and rotatable with said rotatable means and having a diameter less than that of said annular wall so as to afford
(a) an annular space, and
(B) a feed element secured to said core and extending into said space to engage hay and the like and terminating axially adjacent to said press wheel; and
(VI) said relative diameters are such that straight lines drawn from the centers of the core and press wheel through the intersection of the circles of said core and press wheel intersect to form an angle in the order of 20°–40° as measured in said annular space.

References Cited

UNITED STATES PATENTS

| 3,202,113 | 8/1965 | Love | 107—14 |
| 3,232,245 | 2/1966 | Lawrence et al. | 107—14 |
| 1,238,981 | 9/1917 | Barton. | |
| 2,063,404 | 12/1936 | Selman. | |
| 2,798,444 | 7/1957 | Meakin. | |
| 3,327,653 | 6/1967 | Crane | 107—14 |

FOREIGN PATENTS

| 26,750 | AD 1911 | Great Britain. |
| 1,250,174 | 11/1960 | France. |

OTHER REFERENCES

Agricultural Engineering, S. 671.A3, August 1961, pp. 412–415 and 423.

BILLY J. WILHITE, *Primary Examiner.*